(12) United States Patent
Nascimento et al.

(10) Patent No.: US 7,931,871 B2
(45) Date of Patent: Apr. 26, 2011

(54) INNER TRAY FOR A CHAMBER

(75) Inventors: Pedro Nascimento, Le Havre (FR);
Pedro Da Silva, Chassagny (FR);
Matthew Allen, Pennedepie (FR)

(73) Assignee: Total Raffinage Marketing, Puteaux (FR)

( * ) Notice: Subject to any disclaimer, the term of this patent is extended or adjusted under 35 U.S.C. 154(b) by 638 days.

(21) Appl. No.: 11/792,585

(22) PCT Filed: Dec. 7, 2005

(86) PCT No.: PCT/FR2005/003070
§ 371 (c)(1),
(2), (4) Date: May 27, 2008

(87) PCT Pub. No.: WO2006/061516
PCT Pub. Date: Jun. 15, 2006

(65) Prior Publication Data
US 2009/0047194 A1 Feb. 19, 2009

(30) Foreign Application Priority Data

Dec. 8, 2004 (FR) .................... 04 13065

(51) Int. Cl.
*B01J 19/00* (2006.01)
*B01J 35/02* (2006.01)
*B01D 3/14* (2006.01)
*C10J 1/08* (2006.01)

(52) U.S. Cl. ..... 422/129; 422/211; 202/153; 261/114.1; 261/114.2; 261/114.3; 261/114.4; 261/114.5

(58) Field of Classification Search .... 261/114.1–114.5; 422/211, 129; 202/153
See application file for complete search history.

(56) References Cited

U.S. PATENT DOCUMENTS

| 4,133,852 | A | * | 1/1979 | DiNicolantonio et al. | 261/114.5 |
|---|---|---|---|---|---|
| 6,068,244 | A | | 5/2000 | Burton et al. | |
| 7,270,315 | B2 | * | 9/2007 | Burton et al. ............. | 261/114.1 |
| 2003/0019737 | A1 | * | 1/2003 | Matsumoto et al. ........... | 203/99 |
| 2003/0127755 | A1 | * | 7/2003 | Eaton, Jr. ................... | 261/114.5 |

FOREIGN PATENT DOCUMENTS

| DE | 19 20 268 A1 | 10/1970 |
|---|---|---|
| GB | 625418 A | 6/1949 |
| GB | 2 321 417 A | 7/1998 |

* cited by examiner

*Primary Examiner* — Walter D Griffin
*Assistant Examiner* — Natasha Young
(74) *Attorney, Agent, or Firm* — Sughrue Mion, PLLC

(57) ABSTRACT

The invention concerns an inner tray, arranged inside a chamber, comprising a plurality of parallel beams (1), located in a common horizontal plane and fixed through their ends to the wall of the chamber, and, between said beams and supported thereby, rows of adjacent rectangular plates (2), completely covering the space between the beams. The invention is characterized in that the supporting edges (3) of the plates (2) through which the latter are supported on the beams (1), are folded downwards by two substantially right-angled folds, and in that each of the edges (4) of the plates (2), perpendicular to the beams (1) is folded so as to form a female part (4*a*) or a male part (4*b*) capable of being respectively nested in a male (4*b*) or female (4*a*) part formed by the folded edge of the adjacent plate. The invention also concerns a chamber containing such a tray.

25 Claims, 4 Drawing Sheets

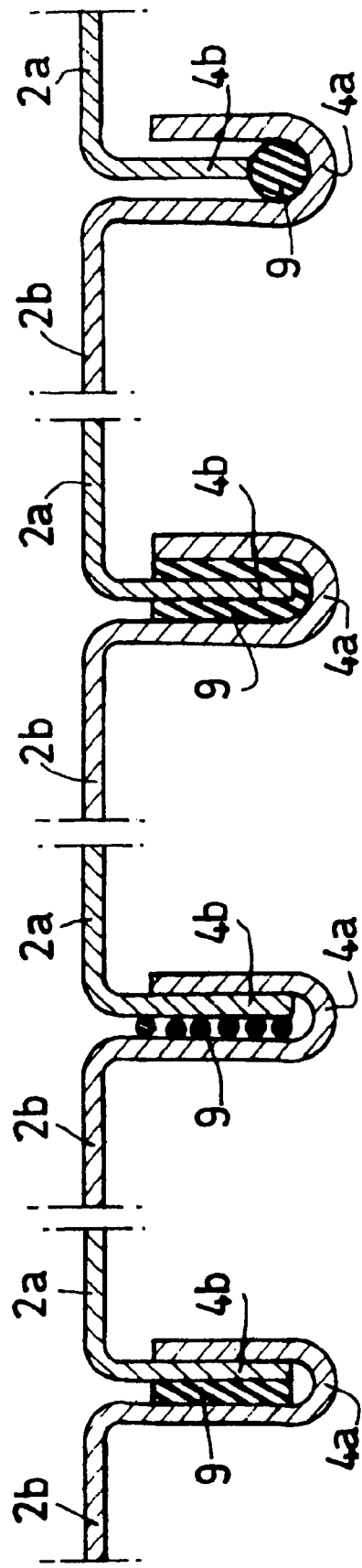

INNER TRAY FOR A CHAMBER

BACKGROUND OF THE INVENTION

The invention relates to a novel type of internal for installation inside a chamber, particularly cylindrical, which can be rapidly assembled and disassembled, without welding, and without screws or clamping bolts.

The invention relates more particularly to a distribution tray for a fixed catalyst bed chemical reactor, fed with a gas/liquid mixture and preferably operating in cocurrent downflow.

This is the application referred to below in the rest of the present description, but the internal of the invention can be installed in all sorts of large-sized chambers, used in the chemical or petroleum industry or elsewhere, in which it is necessary, for example, to install a separation platform or a tray, perforated or not, serving for example for the distribution of a liquid or as a support tray for any type of filler or packing.

In fixed catalyst bed chemical reactors, traversed by a mixed downflow consisting of a gas phase and a liquid phase, the fine dispersion of said liquid phase in the gas phase and the uniform distribution of the mixture obtained over the entire surface of the catalyst bed, constituting the reaction zone, are commonly obtained by means of substantially horizontal perforated trays called "distribution trays". For this purpose, these trays are generally formed from a single plate or a set of juxtaposed, welded, screwed or bolted plates, having a total area substantially identical to the area of the reactor cross section, generally cylindrical. Each plate comprises a large number of perforations each surrounded by a vertical cylindrical wall (called "riser" in the art) comprising, at its base, one or more holes or slits. These distribution trays, equipped with risers, operate according to the following principle: the gas introduced under pressure at the top of the reactor passes through the perforations surrounded by the risers. The liquid, also introduced at the top of the chamber, is retained on the plate from which it cannot flow freely due to the damming action of the risers. The liquid rises to a level identical to that of the height of the holes at the base of the risers and flows through them into the openings of the risers, where it is dispersed in fine droplets, being propelled by the gas stream.

Caps, or circular or rocker-shaped valves, can replace the abovementioned risers, particularly in trays used as elements for increasing the impingement area between the gas and the liquid in distillation columns, for example, crude oil distillation columns. Also found in the art are perforated downcomer trays, in which the gas passes through simple perforations distributed in the plates forming the active area of said trays.

The present invention relates not to the various types of elements for retaining, mixing or dispersing the liquid phase, but to a system for assembling and fixing plates constituting the tray in the reactor. This assembly and fixing system, as described below, is consequently not limited to a particular type of plate or use, but applies to any type of tray to be installed and, if necessary, rapidly disassembled, in any type of chamber.

Various distribution trays for chemical reactors have been proposed in the art and are described, for example, in FR 2 745 202, EP 768 914, EP 1 147 809, U.S. Pat. No. 3,524,731 or U.S. Pat. No. 5,882,610. Some of these trays are of the single-plate type, with a self-supporting structure, and are factory mounted inside the reactor. Others consist of several elements fixed to one another, and to holding beams, by screws or bolts, as indicated in U.S. Pat. No. 5,192,465 or U.S. Pat. No. 6,267,359. Such a screwing or bolting system has many drawbacks, and particularly that of the high cost of procuring the screws or bolts, particularly when the area of the distribution tray may be as high as about 10 square meters. A further drawback associated with this fixing system is to make the assembly and, above all, the disassembly thereof, whether partial or total, in the reactor, time-consuming and difficult, for example, in case of renewal of the catalyst bed. Furthermore, the personnel in charge of these operations must be protected against potentially toxic waste vapors by protective clothing, which severely limits their mobility and agility in handling tools such as wrenches or screwdrivers. All these drawbacks associated with lengthy and difficult handling operations ultimately imply prolonged reactor down time, which is detrimental to operating profitability.

Moreover, to guarantee undisturbed operation and also uniform distribution of the gas/liquid mixture at the surface of the catalyst bed, a distribution tray must be flat and horizontal and as tight as possible at the junctions between its various elements.

In the course of its research aimed at improving the structure of distribution trays and at facilitating their installation in reactors, the Applicant has developed a novel type of tray that is at once solid, tight at the junctions between the plates constituting it, and easy to assemble or disassemble. This tray consists of a set of plates some of whose edges are made up of female or male parts, capable of nesting respectively in the matching male or female parts of the adjacent plates, in order to form rows of juxtaposed plates fixed to one another without the need for screws or bolts. In this reactor, these rows of plates, which must be perforated for this specific type of use, are supported by beams fixed by their ends to the reactor walls, to which they are connected by a system without screws or bolts.

SUMMARY OF THE INVENTION

The plate assembly and fixing system according to the present invention thereby provides for very rapid disassembly, partial or total, and very rapid reassembly of the distribution tray, dimensioning of the size of the manhole to the customer's requirements, and perfect tightness at the junctions between adjacent plates. Furthermore, although the plates are arranged on beams via two parallel edges only, their fixing thereto according to the invention, and the system proposed for nesting the plates together, allows their rigid positioning, withstanding any undesired movement which could cause sudden changes in pressure (hammer) liable to occur during the operation of the reactor.

The present invention consequently relates to an internal component, also called below "inner tray", placed in a chamber, comprising a plurality of parallel beams, located in a common horizontal plane and fixed via their ends to the chamber wall, and, between said beams and supported thereby, rows of adjacent rectangular plates, completely covering the space between the beams, characterized in that the supporting edges of the plates through which said plates rest on the beams, are folded downward by two substantially right-angle folds, and each of the edges of the plates, perpendicular to the beams, is folded so as to form a female part or a male part capable of nesting respectively in a male part or a female part formed by the folded edge of the adjacent plate.

Each of the rectangular plates forming the inner tray of the present invention consequently has two assembly edges and two supporting edges whereby it rests on the support beams.

Furthermore, each of the rectangular plates of the tray of the invention preferably comprises a plurality of perforations, preferably each surrounded by a vertical cylindrical wall (riser) comprising, at its base, one or more holes or slits.

The beams supporting the plates preferably have a cross section comprising an inverted T-shaped part with a vertical part and two horizontal parts for supporting the supporting edges of the rectangular plates forming the tray of the invention.

The assembly edges may of the male type (=edge forming a male part) or female type (=edge forming a female part) and each plate may comprise two male edges or two female edges or even one male edge and one female edge, these two assembly edges being parallel to one another and perpendicular to the support beams.

In a preferred embodiment of the present invention, a male part is formed at the plate edges via a single downward fold of said edge, preferably a single downward right-angle fold. This male edge, of simple construction and very easy to manufacture, fits into a matching female type of edge, preferably formed via a downward fold followed by an upward fold, culminating in a V or U conformation. To ensure proper tightness at the plate assembly joints, the width of the folded part of the male edges is substantially identical to the depth of the V or U structure of the female edge.

A row of perforated rectangular plates can thereby be assembled inside the chamber by simply inserting the male edges into the female edges.

Each rectangular plate thereby comprises two assembly edges, male or female, and two edges via which the row of plates rests on the support beams. In a preferred embodiment of the present invention, the folded parts of the edges are welded to one another at the corners of the perforated plates, thereby advantageously increasing the stiffness of the plate.

To ensure proper tightness of the tray at the assembly joints, seals are preferably provided at the contact surfaces between the female part of one plate and the male part of an adjacent plate. These seals must have good heat resistance and good chemical resistance to the reaction medium which may, for example, be a hydrocarbon solvent. As preferred seal materials for the application in hydrocarbon reactors, mention can be made of ceramic fibers or carbon fibers. These fibers are preferably in the form of woven, knitted or nonwoven fabric. The fabric form permits particularly easy, flexible and uniform application along all the lengths of the assembly edges.

These ceramic fiber or carbon fiber fabrics useable as seals for the distribution trays of the present invention are known and are available respectively, for example from the companies Silitex under the reference VRT750 and Bekaert under the reference Bekitherm NP350.

For the abovementioned reasons, seals of the above type are preferably also provided at the contact surfaces between the support beams and the folded parts of the edges resting thereon. In a particularly preferred embodiment of the present invention, the upper sides of the two horizontal branches of the support beams are lined along their entire width and length with a fabric structure of ceramic fibers or carbon fibers. This fabric structure may also extend on part or all of the surface of the vertical part of the beams, particularly the part in contact with the edges of the perforated plates.

The vertical part of the beams supporting the rows of plates of the present invention does not only serve as a stop for the alignment of the plates of each row, but may also serve to immobilize and fix the plates to the beams without the use of screws or bolts. To obtain such a fixing of the plates without screws or bolts, the vertical part of the beams must project beyond the horizontal plane defined by said beams, at least on part of the length of the beams.

In their vertical part(s) projecting beyond the horizontal plane defined by the adjacent plates, the support beams comprise orifices, or guides, for inserting fixing means, other than screws or bolts, to immobilize the plates on the horizontal parts of the beams. These fixing means are, for example, pins or keys. A particularly preferred embodiment of a fixing system is described in greater detail below with reference to the drawings appended hereto.

In principle, the perforated plates forming a distribution tray of the present invention may be made from any material that is sufficiently stiff to avoid plastic deformation under a load equivalent to that of a man. The material must also have good chemical resistance to the reaction medium. Finally, the material must advantageously be hot- or cold-deformable to permit the folding of the plate edges. In a preferred embodiment of the invention, the perforated plates are made from stainless steel, and particularly from a steel having the trade name SS 321.

The thickness of the plates obviously depends on the mechanical properties of the plate material and the size of the plates. This thickness must be sufficient to impart good deformation resistance to the plates but must not exceed a certain upper limit, beyond which the folding of the edges would be too difficult, and beyond which the plates would be too heavy to be lifted by a human being. The Applicant has found that a thickness of between 1 mm and 10 mm, and preferably between 3 mm and 5 mm, is generally suitable for manufacturing plates having both good deformation resistance and good foldability.

The thickness of the plates of the present invention may be lower than that of equivalent known plates, not folded on their edges. In fact, the presence of four folded edges, possibly welded to one another at the corners, considerably increases the stiffness of the plates.

The rectangular perforated plates described above are assembled in rows, after introduction into the reactor. This assembly is preferably made by starting from the edge or edges of the distribution tray, that is from the reactor walls. When the reactor has a cylindrical shape, which is generally the case, the perforated plates adjacent to the wall are obviously not rectangular, but comprise a curved edge. This curved edge rests on a support ring fixed to the reactor wall. To guarantee proper tightness at the periphery of the distribution tray, it is recommended to provide a seal of the type described above between the support ring and the rounded edge of the peripheral plates.

As indicated above, each rectangular perforated plate comprises two opposing edges, made up of a male part or a female part. A perforated tray forming an element of the distribution tray of the invention may comprise either two male edges, or two female edges, or one male edge and one female edge.

In a first embodiment of the distribution tray of the present invention, a row of rectangular perforated plates consists of identical plates each comprising a folded edge shaped like a male part and a folded edge shaped like a female part. In this embodiment, the female edge of each plate is blocked by the male edge of the neighboring plate fitting from above into the female edge.

In order to remove one of the plates in the middle of a row, for example in order to clear a space to prepare a manhole in the distribution tray, it is therefore necessary to disengage its female edge by first lifting the male edge of the adjacent plate. This operation could be difficult to perform for a single person.

This problem is solved by another embodiment of the distribution tray of the present invention, in which a row of perforated rectangular plates consists both of plates comprising two folded edges shaped like a male part and plates comprising two folded edges in the shape of a female part, these two types of plates being arranged alternately. This embodiment has the advantage that any of the plates with two male edges can be removed without the need to first lift an adjacent plate. However, the above problem is not solved if the need arises to remove two adjacent plates, because one of the male edges of the second plate will be blocked by the female edge of the third plate.

In a third, particularly preferred mode of assembly according to the present invention, it is possible to remove a desired number of plates in a row without the need to first lift the neighboring plate. In this embodiment, a row of perforated rectangular plates consists of a plate comprising two folded edges shaped like a male part and several other plates, each comprising a folded edge in the shape of a male part and a folded edge in the shape of a female part, placed on either side thereof. Such a row is assembled by starting at the two ends of the row by nesting the male edge of each new plate in the female edge of a plate already installed, and terminates with the insertion of the plate comprising two male edges. In order to open a manhole in such a row, the plate with two male edges is first removed, optionally followed by a number of neighboring plates none of which is blocked by an adjacent plate.

The invention not only relates to a tray as described above, but also to a chamber comprising such a tray. When one, a plurality of or all the plates forming the tray comprise perforations for the passage of a homogenous or heterogeneous fluid phase, the tray plays the role of a distribution tray. A chamber of the invention comprising such a distribution tray is preferably a reactor, for example a chemical reactor with a fixed catalyst bed operating with gas/liquid cocurrent downflow. In another embodiment, the chamber comprising a distribution tray of the invention is a distillation column. The perforations of the plates are then preferably provided with valves.

BRIEF DESCRIPTION OF THE DRAWINGS

The invention is now described with reference to the drawings appended hereto, which are nonlimiting, and in which:

FIG. 3 is a cross section of a row of plates assembled according to a preferred embodiment of the invention, Each of the FIGS. 4a, 4b, 4c and 4d is a detailed view of a junction between two plates of the tray, showing various alternative seals.

DETAILED DESCRIPTION OF THE INVENTION

Figure 1:
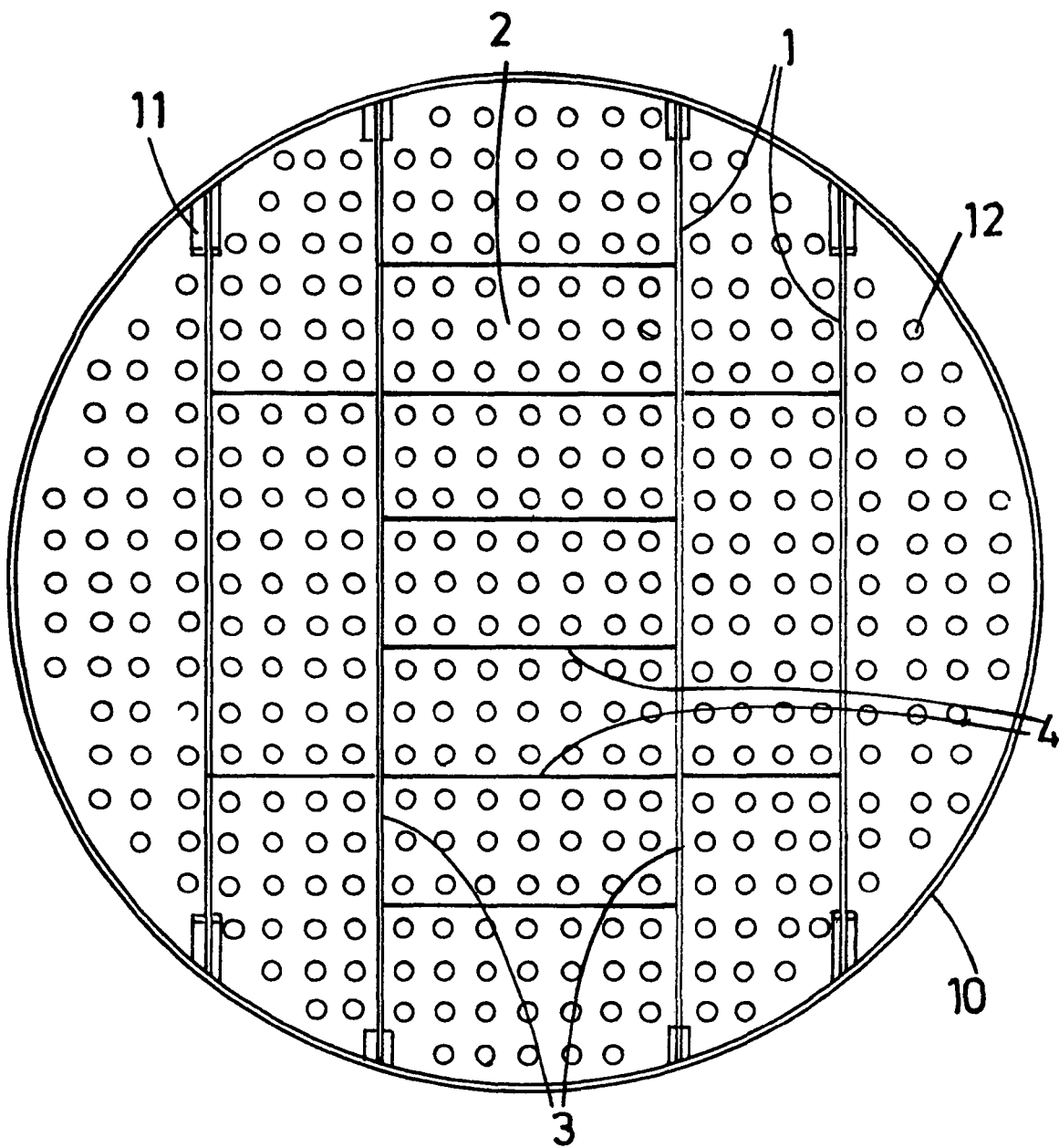
FIG. 1 is a view from above of a distribution tray of the invention.

FIG. 1 shows a distribution tray of the invention consisting of four beams 1, parallel to one another and located in a common plane, supporting several series of plates 2. The beams 1 are fixed, by means of known fixing devices 11, to a support ring (not shown) fixed in turn to the wall 10 of the reactor.

All the plates 2, with the exception of those in contact with the reactor wall 10, have a rectangular shape. Each rectangular plate 2 has two edges 3 via which it rests on the beams 1, and two edges 4, perpendicular to the beams 1 and to the edges 3, nesting in each other in the way explained in greater detail in the following figures. Each plate, whether rectangular or not, comprises a certain number of perforations 12 arranged at a uniform distance from one another. These perforations 12, designed for mixing the liquid phase with the gas phase, introduced at the top of the reactor, and for distributing the gas/liquid mixture over the entire surface of the underlying catalyst bed, are generally surrounded by a riser designed to retain the liquid, described in greater detail in FIG. 5 below.

The perforated plates in contact with the wall 10 of the cylindrical reactor have a rounded edge which perfectly matches the curvature of this wall 10. The rectangular plates 2 and nonrectangular plates are joined and, in combination with the beams 1 on which they rest, cover the entire cross section of the reactor, thereby permitting good retention of the liquid phase which only flows through the perforations 12 provided for this purpose.

Figure 2:
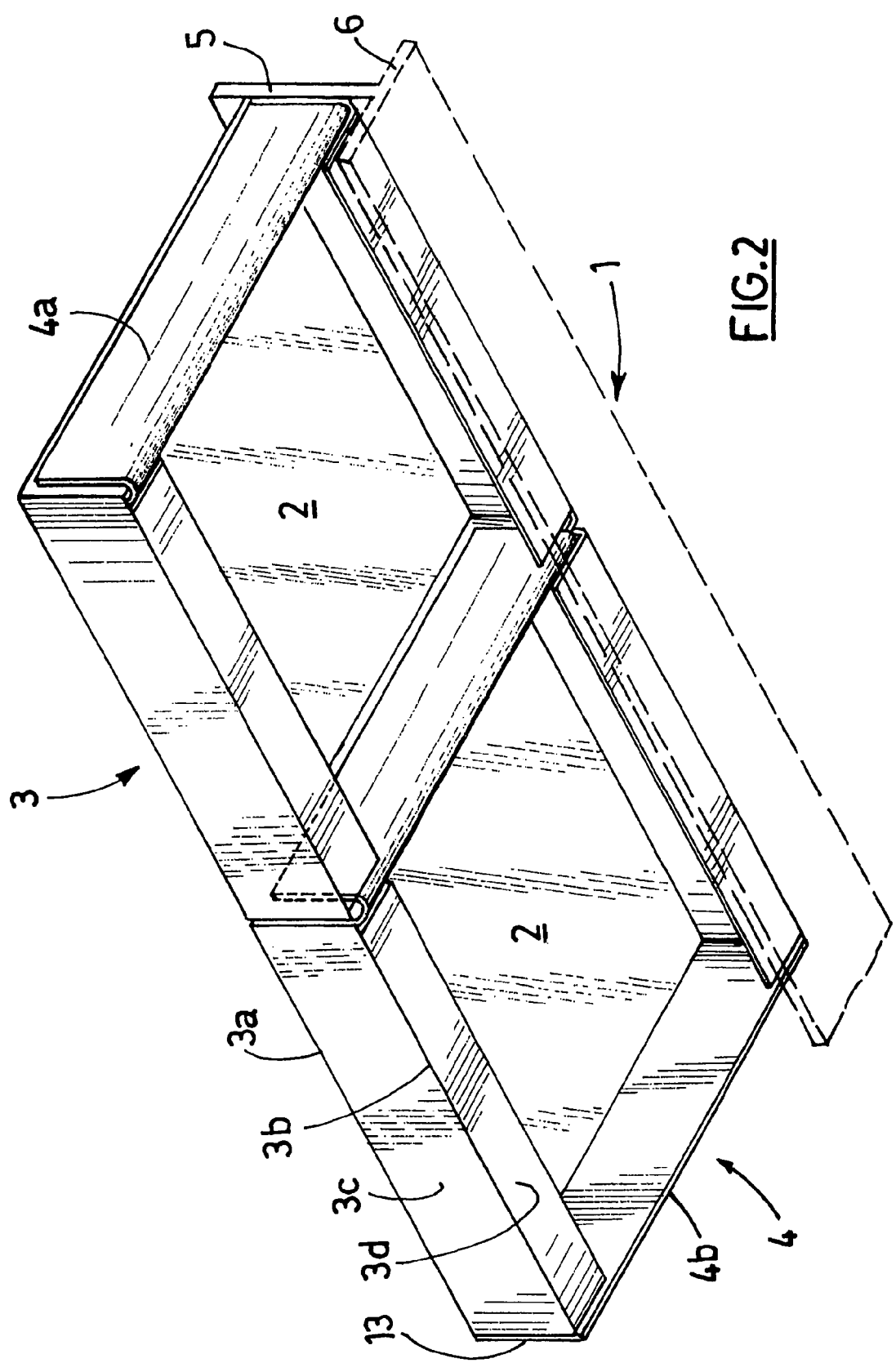
FIG. 2 is a perspective view from below of two plates assembled by nesting the male edge in the female edge.

FIG. 2 shows in greater detail the particular conformation of the folded edges of a rectangular plate 2 forming an element of the distribution tray of the invention. For the sake of simplification of the drawing, the plates are shown in this figure without the perforations 12 visible in FIG. 1.

Each of the plates, made from sheet metal, comprises two parallel edges 3 via which it rests on the beams. Each edge 3 is formed by a double right-angle fold extending along its whole length, that is, by a first downward right-angle fold 3a defining a vertical part 3c, followed by a second fold 3b toward the center of the plate defining a horizontal part 3d, parallel to the main plane of the plate 2. This horizontal part 3d rests on one of the two horizontal branches 6 of the beam 1, while the vertical part 3c bears against the vertical branch 5 of the beam 1.

Each of the plates 2 also has two assembly edges 4, perpendicular to the edges 3. These assembly edges are conformed either as a female edge 4a, or as a male edge 4b. A male edge 4b is formed by a single downward right-angle fold. A female edge 4a is formed by a downward right-angle fold, followed by upward rounded fold, thereby defining a narrow U structure. Two plates 2 are assembled by simply inserting the vertical part of a male edge 4b of one of them into the U formed by the female edge 4a of the other.

The particular edge folding mode described above is suitable for welding the edges 3 to the edges 4, along the connecting line 13 at the corners of the plates, thereby considerably increasing the stiffness of each plate.

FIG. 3 is a cross sectional view of a row of plates assembled according to a preferred embodiment of the present invention. A plate 2a comprising two male edges 4b is placed at the centre of the row. Each of these two male edges 4b is inserted into the female edge 4a of a "mixed" neighboring plate 2b, that is, comprising one male edge 4b and one female edge 4a. As explained above, this plate assembly mode enables the easy and rapid dismantling of the row from the center thereof, that is, from the plate 2a.

FIG. 4a is an enlarged view of the assembly junction of two plates of the row of plates in FIG. 3. A seal 9 in tape form, preferably made from ceramic fibers or carbon fibers, is placed between the male part 4b and the female part 4a of the plates. In FIG. 4b, the seal 9 consists not of a single tape, as in FIG. 4a, but of a plurality of parallel strips. FIG. 4c shows a seal 9 in the form of a tape inserted between the male 4b and female 4a parts of the junction, and preventing any direct contact between them. According to a further embodiment, shown in FIG. 4d, the seal 9 takes the form of a strip of circular section located in the root of the male part, onto which the female part 4a presses, in order, as in the previous figure, to prevent any direct contact between these two matching parts.

Figure 5:
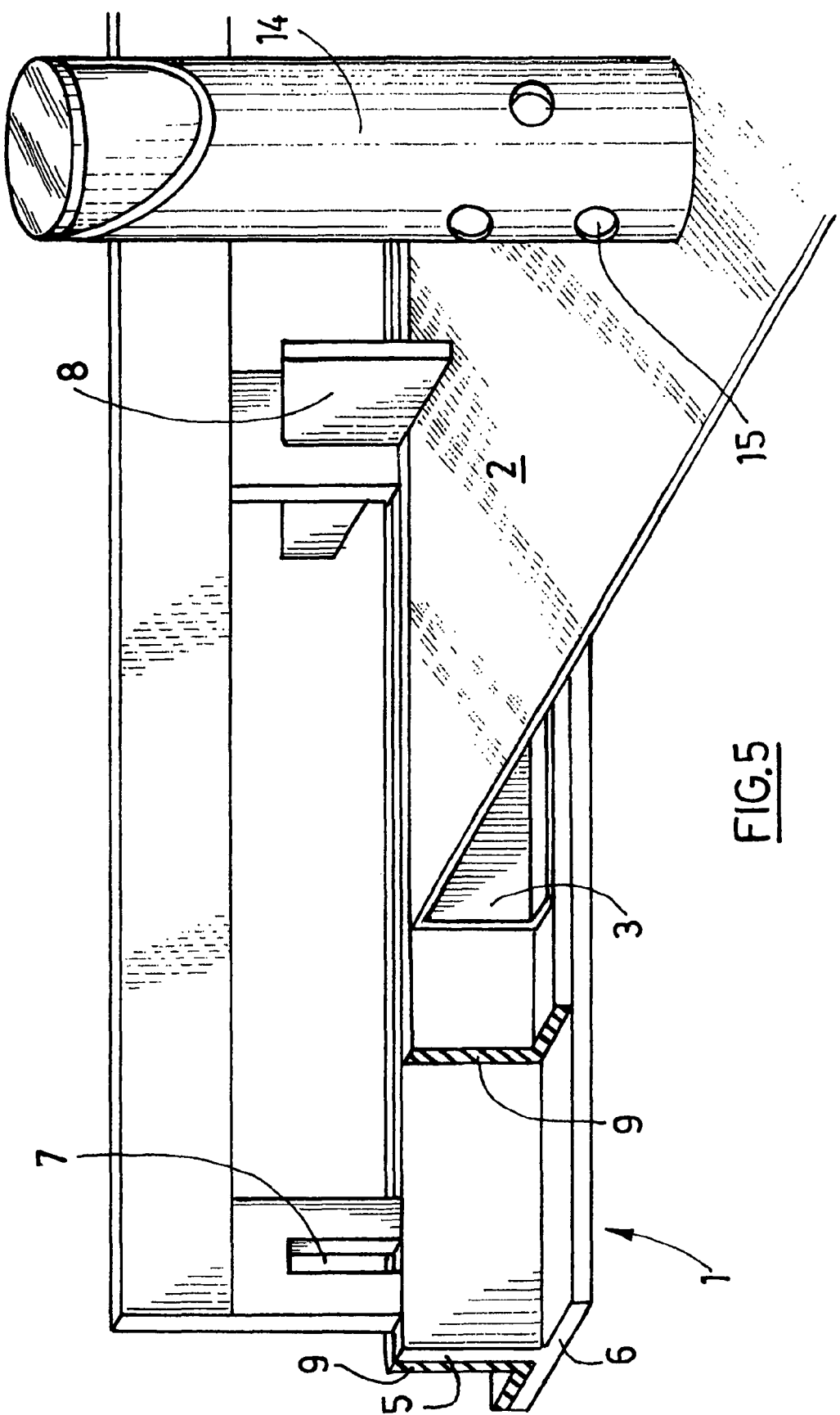
FIG. 5 is a perspective view from above of a perforated plate, fixed to a support beam by a key.

Finally, FIG. 5 shows a mode of fixing rectangular perforated plates 2 to the beams 1 of the distribution tray of the present invention.

In this figure, the vertical part 5 of the beam 1 projects beyond the horizontal plane defined by the plates 2. In this projecting part, orifices 7, or guides are provided, for inserting a known fixing means 8, such as a key. This key 8, due to its inclined upper edge, can be forced into and blocked in the orifice 7, for example using a hammer. In a preferred embodiment, this key 8 is formed from two plates welded to the longest vertical edge. The spacing of these two plates at the "nose" (small nonwelded end) of the key 8, after insertion thereof into the guide 7, effectively blocks the key 8 and the plate 2.

A seal 9 is inserted between the edge 3 of the plate and the beam 1. This seal 9 is preferably a woven or knitted fabric of ceramic fibers or carbon fibers covering the entire contact surface between these two elements.

This figure also shows a riser 14 surrounding a perforation 12 (not shown) in the plate 2. In a manner known per se, the gas introduced at the top of the reactor flows downward through this riser 14, entraining the liquid in its path flowing through the orifices 15 provided at the base of the riser 14.

The invention claimed is:

1. An inner tray, to be placed in a chamber, the inner tray comprising:
   a plurality of parallel beams (1), located in a common horizontal plane and fixed via their ends to the chamber wall, and, between said beams and supported thereby, rows of adjacent rectangular plates (2), completely covering the space between the beams, wherein
   the supporting edges (3) of the plates (2) through which said plates rest on the beams (1), are folded downward by two substantially right-angle folds, and
   each of the edges (4) of the plates (2), perpendicular to the beams (1), is folded so as to form a female part (4a) or a male part (4b) capable of nesting respectively in a male part (4b) or a female part (4a) formed by the folded edge of the adjacent plate.

2. The tray according to claim 1, wherein each of the plates (2) comprises a plurality of perforations, and each perforation is surrounded by a vertical cylindrical wall comprising, at its base, one or more holes or slits.

3. The tray according to claim 1 or 2, wherein the beams (1) have a cross section comprising an inverted T-shaped part with a vertical part (5) and two horizontal parts (6) for supporting the supporting edges (3) of the rectangular plates forming the tray.

4. The tray according to claim 3, wherein the vertical part (5) of the beams (1) projects at least partly beyond the horizontal plane defined by the plates (2).

5. The tray according to claim 4, wherein the beams (1) comprise, in their vertical part (5) projecting beyond the horizontal plane defined by the plates (2), orifices (7) for inserting fixing means (8) to immobilize the plates (2) on the horizontal parts (6) of the beams.

6. The tray according to claim 5, wherein the fixing means (8) are pins or keys.

7. The tray according to claim 1, wherein a male part (4b) is formed at the edges (4) of the perforated plates (2) via a single downward fold of said edge (4).

8. The tray according to claim 7, wherein a female part (4a) is formed at the edges (4) of the perforated plates (2) via a downward fold followed by an upward fold, culminating in a V or U conformation.

9. The tray according to either claim 7 or 8, wherein the folded parts of the edges are welded to one another at the corners of the perforated plates (2).

10. The tray according to claim 1, wherein the plates (2) are made from a rigid material.

11. The tray according to claim 10, wherein the plates (2) are made from steel.

12. The tray according to claim 10, wherein the plates (2) are made from stainless steel.

13. The tray according to claim 10, wherein the plates (2) are made from steel having the trade name SS 321.

14. The tray according to claim 1, wherein the plates have a thickness of between 1 mm and 10 mm.

15. The tray according to claim 1, wherein seals (9) are provided at the contact surfaces between the female part (4a) of one plate and the male part (4b) of an adjacent plate and/or at the contact surfaces between the beams (1) and the folded parts of the edges (3) of the plates.

16. The tray according to claim 15, wherein the seal is made from ceramic fibers or carbon fibers.

17. The tray according to claim 1, wherein a row of plates (2) consists of identical plates each comprising a male folded edge shaped part (4b) and a female folded edge shaped part (4a).

18. The tray according to claim 1, wherein a row of plates (2) consists of plates comprising two male folded edge shaped parts (4b) and plates comprising two female folded edge shaped parts (4a), arranged alternately.

19. The tray according to claim 1, wherein a row of plates (2) consists of a plate comprising two male folded edge shaped parts (4b) and several other plates, each comprising a male folded edge shaped part (4b) and a female folded edge shaped part (4a), placed on either side thereof.

20. A chamber comprising a tray according to claim 1.

21. A chamber comprising a tray according to claim 1, wherein the chamber is a reactor.

22. A chamber comprising a tray according to claim 1, wherein the chamber is a distillation column.

23. The tray according to claim 1, wherein a male part (4b) is formed at the edges (4) of the perforated plates (2) via a single downward right-angle fold.

24. The tray according to claim 1, wherein the plates have a thickness of between 3 mm and 5 mm.

25. A chamber comprising a tray according to claim 1, wherein the chamber is a chemical reactor having a fixed catalyst bed operating with gas/liquid cocurrent downflow.

* * * * *